(No Model.)  3 Sheets—Sheet 1.
I. N. LEWIS.
SYSTEM OF CAR LIGHTING, HEATING, &c.
No. 516,495. Patented Mar. 13, 1894.
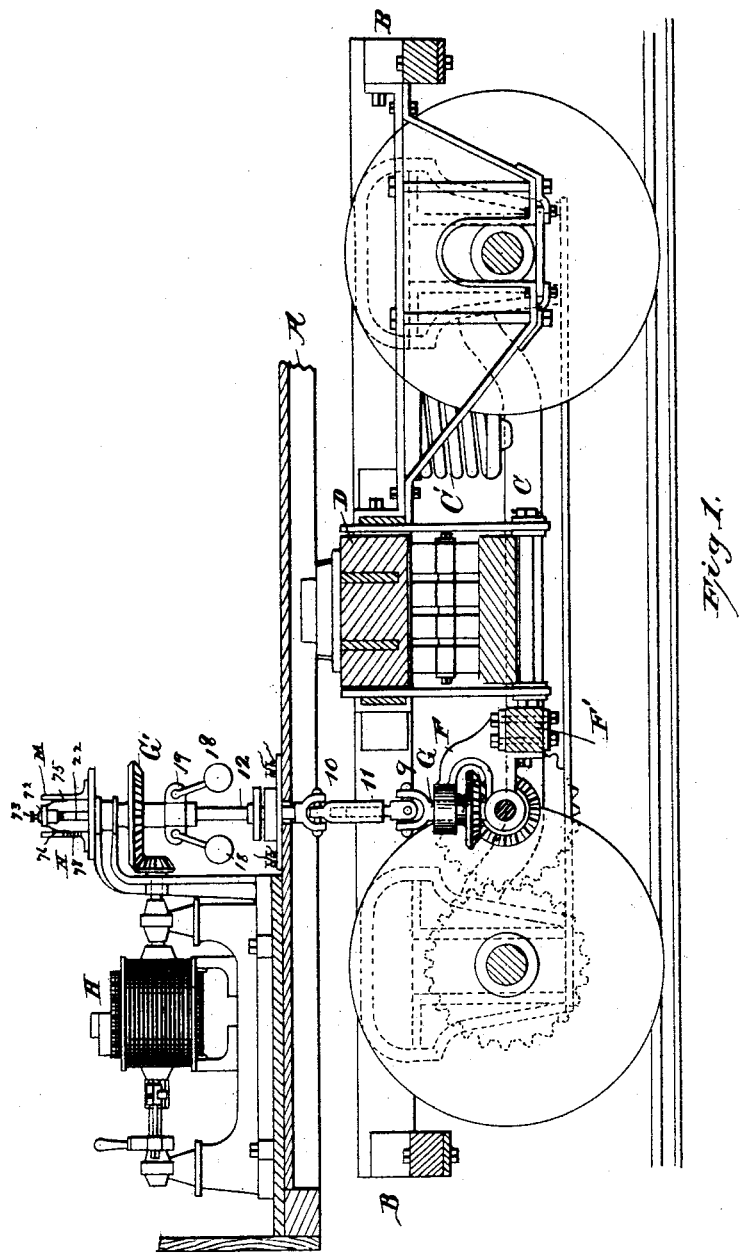

(No Model.) 3 Sheets—Sheet 2.
I. N. LEWIS.
SYSTEM OF CAR LIGHTING, HEATING, &c.
No. 516,495. Patented Mar. 13, 1894.
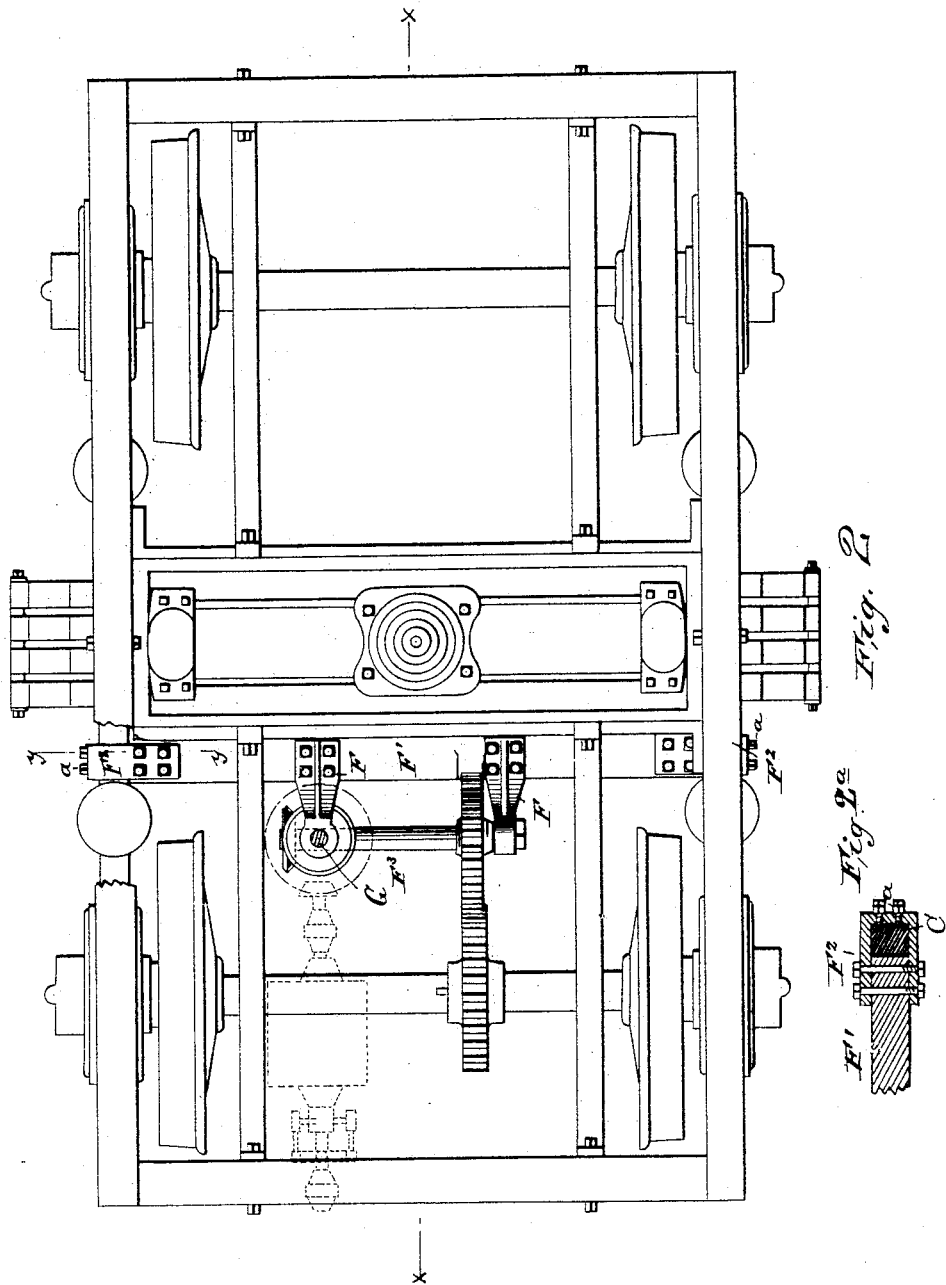
Attest,
C. W. Benjamin
W. H. Capel.
Inventor;
Isaac N. Lewis,
by H. E. Townsend
Atty.

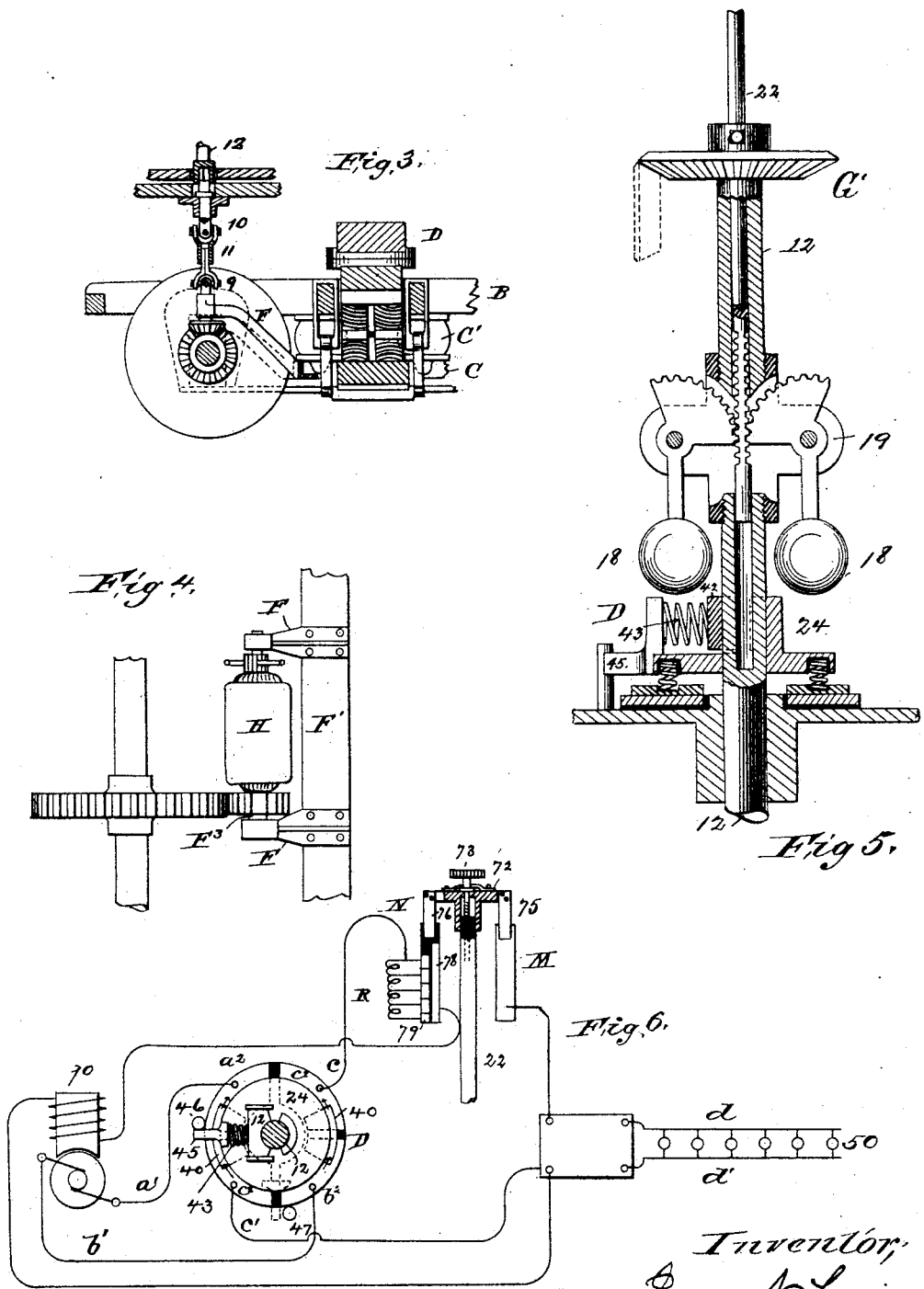

United States Patent Office.

ISAAC N. LEWIS, OF FORT WADSWORTH, NEW YORK, ASSIGNOR TO THE LEWIS ELECTRIC COMPANY, OF NEW JERSEY.

SYSTEM OF CAR LIGHTING, HEATING, &c.

SPECIFICATION forming part of Letters Patent No. 516,495, dated March 13, 1894.

Application filed July 15, 1893. Serial No. 480,578. (No model.)

*To all whom it may concern:*

Be it known that I, ISAAC N. LEWIS, a citizen of the United States, and a resident of Fort Wadsworth, in the county of Richmond and State of New York, have invented a certain new and useful System of Car Lighting, Heating, &c., of which the following is a specification.

My invention relates to systems of car lighting, heating, ventilation, &c., wherein electricity is employed as the lighting, heating or motor agent, and is designed more particularly as an improvement upon that class of apparatus wherein the dynamo is driven by power taken from the car axle and the interruptions of driving power due to stoppage of the car are taken care of by a storage battery connected to said dynamo.

One part of my invention relates to the means for obtaining a positive, practical and durable driving connection between the car axle and the dynamo supplying the storage battery on the cars of steam railways equipped with a swiveling truck. Heretofore in this art resort has been had to belt connections or similar devices and the mounting of intermediate power transmitting wheels or shafts either upon the car body or upon the spring supported portion of the frame. This has made it necessary to employ special devices for compensating for the relative movement between the axle and the car body supported on the usual swinging bolster or between the axle and the truck frame proper, in order to maintain a proper power connection between the dynamo and the axle under all conditions of service. Such devices have been found unsatisfactory and liable to get out of order under the strain of power transmission.

My invention avoids the difficulties incident to prior plans and gives a positive power connection from the axle while preserving a fixed positive relation of the parts under all conditions unaffected by any vertical or swivel motions either of the car body or the truck frame, and consists essentially in the combination with the dynamo armature and the car axle in a swiveling truck, of a power transmitting shaft and a bearing therefor in fixed or immovable relation to said axle and a supporting arm or bracket for said bearing fastened to the equalizing bar of the truck. Said arm or bracket may be fastened directly to the equalizing bar or may project from a bar attached to the equalizing bars of the truck as will more particularly hereinafter appear.

I prefer in carrying out this part of my invention to clamp a beam to the two equalizing bars at opposite sides of the swiveling truck in position parallel to the car axle and attach the arm of the bearing to said bar. I also prefer to use two bearings which are made to support a counter shaft parallel to the axle and the cross beam fastened between the equalizing bars, said counter shaft transmitting power from the axle to the dynamo armature either through intermediate devices or by the mounting of the armature direct upon it.

Another part of my invention relates to the electrical combination of devices for keeping the charging current for the storage battery constant despite changes in the speed of the car to whose axle the charging dynamo is geared.

Heretofore the attempt has been made to compensate for the varying speed of the car by varying the resistance in a shunt field circuit from the armature by devices responsive to the changes in speed of the vehicle, the action being so adjusted that the charging current will be kept constant. In this arrangement a special adjustment of the resistance has to be made with reference to the two factors of increased armature speed, accompanying axle speed, and increased voltage of the terminal which leads to the shunt field.

My invention consists in combining with the axle driven armature, a separately excited field or one which is constant despite changes of axle speed, being for such purpose excited by a shunt from the storage battery around the translating devices supplied therefrom on the car, and a variable resistance on the main circuit from the armature or similar device for adjusting the charging current as delivered from the said armature revolving on a constant field so as to keep the charging current constant. In this plan of operation a charging current can be promptly developed as soon as the car starts which cannot be always the case when the dynamo is self-excited in shunt in the old plan, while moreover as the voltage will obviously vary directly as the speed of the car increases, it becomes a simple matter to proportion or adjust the resistance initially during construction of the apparatus while under the old plan the adjustment or proportioning of the same for the fluctuations of speed is a matter of trial necessitating the running of the apparatus complete.

In the accompanying drawings:—Figure 1, is a sectional side elevation of an apparatus embodying my invention. Fig. 2, is a plan of a part of the same. Fig. $2^a$, is a sectional detail of Fig. 2 on line Y—Y. Fig. 3, illustrates a modification. Fig. 4, shows a still further modification in the location of the dynamo driven from the car axle. Fig. 5, shows in detail a form of governor and reversing switch that may be employed. Fig. 6, is a general diagram of the apparatus.

A, indicates the car sill of an ordinary passenger coach and B, the main frame of the swiveling truck which said frame is spring supported upon the equalizing bars C, by the springs C'. The said main frame, as is well understood in the art, forms a frame from which depend yokes carrying a suspension bar or cross piece upon which is imposed the elliptic or other springs supporting the swinging bolster indicated at D. The swinging bolster itself has the car sill imposed directly upon it.

The equalizing bars of the truck are imposed directly upon the upper journal box bearings so as to be always in fixed relation to the axle E. Mounted directly or indirectly on said equalizing bars so as to be supported thereon in fixed or immovable relation to the car axles, are arms or brackets F. The preferred construction of this part of my apparatus involves the use of the cross bar or arm F', uniting the equalizing bars and bolted at its opposite ends in the iron shoes $F^2$, which pass over the equalizing bars and are fastened against said bars by set screws $a$, see Fig. $2^a$. By this construction I avoid the necessity of drilling the equalizing bars which would be very objectionable because tending to weaken the same. The arms or brackets F', are furnished with bearings for the power transmitting shaft $F^3$, which is shown as a counter shaft parallel to the car axle and geared therewith through spur wheel gearing or otherwise connected so as to be driven or rotated from the car axle. The counter shaft $F^3$, transmits the power from the axle directly or indirectly to the armature.

In the form of my invention shown in Fig. 1, this shaft transmits power to a vertical shaft G, also mounted in a bearing on a bracket supported by the equalizing bar and connected with the dynamo on the car through a proper flexible connection to be presently described. It would be within my invention, however, to mount the dynamo armature directly upon the counter shaft $F^3$, (Fig. 4) the gear being suitably proportioned to multiply the motion to the desired extent, or, instead of gear wheels, a chain belt may be used. The shaft G, is driven by a bevel gear connection with the counter shaft and transmits motion through the universal joints 9, 10, and a telescope sleeve 11, to a shaft 12, rotating in suitable bearings on the car body. Shaft 12, may have its upper bearing in a bracket rising from the dynamo base. Upon this bracket may be also mounted a stationary portion of the variable resistance switch which operates to control the strength of the current supplied to the battery. The universal or flexible connecting shaft, capable of longitudinal extension and contraction and constructed as just described for the purpose of carrying the power from the car axle to the dynamo, cannot itself be operated at very high speeds. In order, therefore, to permit the proper multiplication of movement between the car axle and the dynamo, so that the latter may be driven at the proper speed, I propose to locate the speed multiplying gear on the car between the said connecting shaft and the dynamo instead of mounting the multiplying devices upon the car truck itself or at such point that they would impart a multiplied speed through the universal joint and telescoping sleeve or shaft. By this means I find it perfectly practicable to employ the universal joint and extensible shaft, as described, which it would not be practicable to use were the multiplying gear located at the other end of the system.

By multiplying gear in this connection, I mean any device for rotating the dynamo armature at a greater speed than the operating shaft 12. As an example of such a device I show a bevel gear wheel G', that is mounted on the shaft 12, and engages with a bevel gear upon the shaft of the dynamo, the latter gear being sufficiently small to give the desired speed to the armature.

Instead of mounting the bracket or arm carrying the bearing for the transmitting shaft G, in the manner shown in Figs. 1 and 2, it might be fastened upon the equalizing bar as indicated in Fig. 3, and have a bearing formed on it for the vertical shaft which would carry a bevel pinion engaging directly with a bevel wheel upon the car axle.

K, is any switch device operated through a rod 22, the office of which switch is to control a circuit of the armature with the storage battery as also the connections of the field magnet. By suitable attachment of the variable resistance the switch also serves to control the current flowing from the armature to the storage battery.

The switch may be constructed as follows:—72, is a head fastened at the top of the rod 22, and adjustable up and down thereon by means of a nut 73. This head carries two springs 75, 76, which are in connection with one another through said head and bear upon the plates M, N. One of these plates M, is of conducting material and the other is made up of insulating and conducting spaces as follows, (see Fig. 6:)—78, is a conducting plate upon which the spring 76, closes to complete the connection of the field magnet with the constant source of energy as soon as the car starts to move. The contacts 79, are connected to the several sections of a variable resistance R, and the spring 76, by reciprocating over said contacts varies the amount of resistance in the circuit between the armature and the storage battery. The spring 75, and plate N, can be in constant connection with one pole of the storage battery as indicated in the diagram. The rod 22, might be operated by any proper device responsive to the change in speed of the car, but for simplicity I prefer to operate it by means of the centrifugal governor, the balls of which, indicated at 18, are mounted upon projections 19, of the shaft 12, and carry two segments engaging with a toothed rack or slide upon which the short rotary spindle 22, is stepped. Also mounted on the vertical rotary shaft, as described in a prior application for patent filed by me September 17, 1892, Serial No. 446,224, is any suitable reversing switch D, placed in the main circuit between the dynamo armatures and the storage battery for the purpose of preserving a constant direction of charging current with reversals of direction in which the car is run. This switch D, may be constructed and connected as follows:—The main circuit wires $a'$ and $b'$ are connected to diametrically opposite contact sectors $a^2$, $b^2$, (Fig. 6,) and the charging wires $c$, $c'$, of the storage battery C, are connected to the alternate diametrically opposite contact sectors $c^2$, $c^2$, of said switch. The movable electrical connecting pieces 40, of the switch D, are mounted beneath the partially rotary disk 24, frictionally connected to the shaft 16, by means of block 42, compressed on said shaft by spring 43, and the rotation of such disk is limited by the abutment of its projecting stop 45, upon rotary pins 46, 47. According to the direction of revolution of the shaft 12, the projection 45 is thrown against stop pin 46 or 47, accordingly determining the connection of the wires $b$, to $c'$, and $a'$, to $c$, in the one instance, or the connection of the wires $b$, to $c$, and $a'$, to $c'$, in the other instance. Thus, the current in $c$, $c'$, through storage battery G, is maintained in a constant direction, irrespective of the direction of charging current generated by the dynamo, the shaft of which is reversible to accommodate itself to the direction of travel of the car.

The lighting and power circuit $d$, $d'$, is independently connected to the storage battery as usual in the art and supplies the electric lamps or other translating devices 50, in multiple arc or may supply any other devices as, for instance, the motors of ventilating fans or electric heating appliances.

The field magnet of the electric motor indicated at 90, is constantly or separately excited by a shunt from the storage battery as shown more clearly in the diagram, one terminal of said field being connected directly to the storage battery and the other to the plates 78, of the switch where it is thrown into connection with the storage battery by the spring 76, as soon as the car starts.

The general operation of the apparatus is as follows: When the car is at rest the switch operated by rod 22, stands in the position shown in the diagram, the circuit of the field 90, from the storage battery being broken so that the battery may not discharge through the same. It will be understood that the separate excitation provided by the connection from the storage battery shown might be provided from any other source and the switch operated in the same manner. One of the charging wires $c'$, connects directly with one pole of the storage battery and the other $c$, connects with the other pole thereof through the variable resistance R, or other current controlling apparatus. As will be seen the charging circuit is broken as the spring 76, is out of contact with the upper one of the series of contacts 79, to which wire $c$, is directly connected. As soon as the car begins to move the exciter circuit is closed by spring 76, but the main circuit remains open until the speed of the car has reached such point that the armature will give sufficient voltage to charge the battery. The main circuit is then closed by the spring 76, coming in contact with the upper one of the plates 79, the circuit then being from the armature by way of the circuit reversing switch D, through spring 75, plate N, storage battery, and back by wire $c'$. If the speed increases so as to raise the voltage of the dynamo beyond a predetermined amount the resistance devices begin to operate to cut down the main current, and as will be seen they may be made to provide a uniform main current despite the changes in speed of running the car. It will be also seen that as the field is separately excited no time is lost in bringing the dynamo up to the voltage necessary for charging the battery as would be the case if it were a self excited shunt wound machine.

It should be understood that, as described in my prior application the brushes of the armature have the zero lead requiring no readjustment when the car reverses its run and the dynamo armature changes its direction of revolution.

In the foregoing description I have set out the use of a variable resistance as a means for controlling the charging current passing from the dynamo armature to the battery, but as well understood in the art other current controllers responsive to the change in the speed of the dynamo might be employed for the same purpose, and I do not wish, therefore, to be understood as limiting myself to the use of a variable resistance as a current controller in the organizations and combinations of apparatus hereinafter claimed.

While I have described my invention as applied to a car axle forming a source of intermittent power that is variable in speed, it will be readily understood that the invention is also of utility as to some of its features when the dynamo is driven from other sources of intermittent and variable-speed power.

What I claim as my invention is—

1. In a railway car carried by a swiveling truck, the combination with a dynamo, power driven from the axle of said truck, of a power transmitting shaft geared to said axle, and a bearing for said shaft carried by an arm or bracket mounted on the equalizing bars of the truck.

2. In a railway car, the combination with a dynamo, power-driven from the axle of the truck, of a counter shaft parallel with and geared to the axle, and connected to the armature of said dynamo directly or indirectly, a cross beam fastened to the equalizing bars of the truck, and bearings for said counter shaft supported on the cross beam.

3. The combination, substantially as described, of the equalizing bars, the shoes fitted over the same, the cross beam supported between the shoes parallel to the car axle, the counter shaft mounted in bearings on said cross beam and geared to the car axle, and a dynamo armature driven by said counter shaft.

4. The combination, substantially as described, of a dynamo having a zero lead for its commutator and mounted on a car, a storage battery supplied by the dynamo, the car axle, suitable transmitting gear connected therewith, a universal or flexible connecting shaft capable of longitudinal extension and contraction connecting said gear with a shaft on the car body, and speed multiplying gear on the car between said shaft and the dynamo shaft.

5. The combination, substantially as described, of a dynamo driven from a source of intermittent or variable-speed power, a storage battery charged thereby, a field for said dynamo having a constant excitation independent of variations of speed of the driving power or of the load upon the working circuit, and a current controller in the direct circuit between the armature and the storage battery, responsive to changes in speed of the driving power.

6. The combination, substantially as described, of a dynamo having its armature driven from a source of intermittent or variable-speed power, a storage battery charged thereby, an automatic current controller in the direct circuit between the armature and the battery for adjusting the charging current to the variations in the speed of the driving power, and a field magnet for said dynamo having an excitation direct from the storage battery that is constant in amount and independent of variations of speed of the dynamo.

7. The combination on a car, of a dynamo whose armature is power-driven from the car axle, a storage battery charged thereby, a field having a constant excitation by current from said storage battery, speed responsive mechanism operated from the car axle, and a switch controlled thereby for breaking the circuit from battery to field when the speed falls to a predetermined amount.

8. The combination, substantially as described, of a dynamo, a storage battery, a field circuit connected to the storage battery, a switch responsive to changes of speed of the dynamo, and contacts and connections of said switch for first completing the connection of the field circuit and battery when the dynamo starts and subsequently connecting the armature and battery.

9. The combination on a car, of a dynamo whose armature is power driven from the car axle, electric lamps or other translating devices operated from said dynamo, a storage battery in shunt across the supply wires, a field for said dynamo having a constant excitation by current from said storage battery, and a switch responsive to changes in the speed of the car for breaking the circuit from the battery through the field when the car stops or the speed decreases to a predetermined amount.

10. The combination of a dynamo, an intermittent and variable speed driving power therefor, electric lamps or other translating devices operated from said dynamo, a storage battery in shunt across the supply wires, a field for said dynamo having a constant excitation by current from said battery, and a switch responsive to changes in the speed of driving of the dynamo for breaking the circuit from the battery through the field when the driving power stops or its speed decreases to a predetermined amount.

Signed at New York, in the county of New York and State of New York, this 12th day of July, A. D. 1893.

ISAAC N. LEWIS.

Witnesses:
WM. H. CAPEL,
T. F. CONREY.